(12) United States Patent
Huang et al.

(10) Patent No.: US 7,778,480 B2
(45) Date of Patent: Aug. 17, 2010

(54) BLOCK FILTERING SYSTEM FOR REDUCING ARTIFACTS AND METHOD

(75) Inventors: Yong Huang, Singapore (SG); Patricia Chiang, Singapore (SG); Lucas Y. W. Hui, Singapore (SG)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 1625 days.

(21) Appl. No.: 10/995,679

(22) Filed: Nov. 23, 2004

(65) Prior Publication Data

US 2006/0110065 A1 May 25, 2006

(51) Int. Cl.
- G06K 9/40 (2006.01)
- H04N 1/32 (2006.01)
- H04N 1/00 (2006.01)
- H04N 1/41 (2006.01)
- H04N 1/413 (2006.01)

(52) U.S. Cl. ............... 382/268; 358/426.01; 358/426.16
(58) Field of Classification Search ......... 382/254–269, 382/232–253; 375/240.1; 358/426.01–426.16
See application file for complete search history.

(56) References Cited

U.S. PATENT DOCUMENTS

| | | | |
|---|---|---|---|
| 5,802,218 A | | 9/1998 | Brailean |
| 6,028,967 A | * | 2/2000 | Kim et al. .................... 382/268 |
| 6,226,050 B1 | * | 5/2001 | Lee ............................. 348/607 |
| 6,240,135 B1 | | 5/2001 | Kim |
| 6,728,414 B1 | * | 4/2004 | Chang et al. ................. 382/254 |
| 7,050,504 B2 | * | 5/2006 | Joch et al. ............... 375/240.26 |
| 2004/0013310 A1 | * | 1/2004 | Suino et al. .................. 382/240 |
| 2004/0126034 A1 | | 7/2004 | Yu et al. |
| 2005/0207492 A1 | * | 9/2005 | Pao ........................ 375/240.16 |

FOREIGN PATENT DOCUMENTS

| | | |
|---|---|---|
| EP | 0 817 497 A3 | 1/1998 |
| EP | 0 961 229 A2 | 12/1999 |
| EP | 1 146 748 A2 | 10/2001 |

OTHER PUBLICATIONS

Sung Deuk Kim et al., "A Deblocking Filter with Two Separate Modes in Block-Based Video Coding," IEEE Transactions on Circuits and Systems for Video Technology, vol. 9, No. 1, Feb. 1999, pp. 156-160.

(Continued)

*Primary Examiner*—Vikkram Bali
*Assistant Examiner*—Randolph Chu
(74) *Attorney, Agent, or Firm*—Lisa K. Jorgenson; William A. Munck (57) ABSTRACT

A method includes identifying a pair of image data blocks separated by a boundary. The image data blocks include image information defining multiple pixels in at least one image. The method also includes identifying at least one filter length based on edge contents of at least some of the pixels in the at least one image. In addition, the method includes filtering at least some of the pixels in the pair of image data blocks along the boundary using the at least one identified filter length.

29 Claims, 7 Drawing Sheets

OTHER PUBLICATIONS

Peter List et al., "Adaptive Deblocking Filter," IEEE Transactions on Circuits and Systems for Video Technology, vol. 13, No. 7, Jul. 2003, pp. 614-618.

William E. Lynch et al., "Post Processing Transform Coded Images Using Edges," 1995 IEEE, Proceedings of the International Conference on Acoustics, Speech, and Signal Processing (ICASSP), Detroit, May 9, 12, 1995, pp. 2323-2326.

Y. L. Lee et al., "Blocking Effect Reduction of JPEG Images by Signal Adaptive Filtering", IEEE Transactions on Image Processing, vol. 7, No. 2, Feb. 1998, pp. 229-234.

Hyun Wook Park et al., "A Postprocessing Method for Reducing Quantization Effects in Low Bit-Rate Moving Picture Coding", IEEE Transactions on Circuits and Systems for Video Technology. vol. 9. No. 1. Feb. 1999, pp. 161-171.

"Preprocessing and Postprocessing", ISO/IEC, 1999, pp. 284-293.

* cited by examiner

BLOCK FILTERING SYSTEM FOR REDUCING ARTIFACTS AND METHOD

TECHNICAL FIELD

This disclosure is generally directed to image processing systems and more specifically to a block filtering system for reducing artifacts and method.

BACKGROUND

Many different compression or encoding schemes are available for compressing or encoding digital video images and other digital images. For example, the Moving Picture Experts Group ("MPEG") encoding standards, including MPEG-1, MPEG-2, and MPEG-4, are routinely used to encode video images. As another example, the Joint Photographic Experts Group ("JPEG") encoding standards are routinely used to encode still images. Typical encoding standards compress images by dividing an image into multiple blocks and then encoding each of the blocks separately.

Compressing video or other image data often results in a loss of information. For example, encoding schemes often use transform coefficients, such as discrete cosine transform ("DCT") coefficients, to represent an image. Typical encoding schemes divide the transform coefficients by a quantization parameter, which often truncates higher frequency transform coefficients more than lower frequency coefficients. This and other problems often cause noticeable flaws or distortions in images displayed after decoding. As an example, distortions along the borders of the blocks (referred to as "blocking artifacts") may be visible in the decoded images.

SUMMARY

This disclosure provides a block filtering system for reducing artifacts and method.

In a first embodiment, a method includes identifying a pair of image data blocks separated by a boundary. The image data blocks include image information defining multiple pixels in at least one image. The method also includes identifying at least one filter length based on edge contents of at least some of the pixels in the at least one image. In addition, the method includes filtering at least some of the pixels in the pair of image data blocks along the boundary using the at least one identified filter length.

In a second embodiment, an image decoder includes a decoder capable of receiving encoded image information defining multiple pixels in at least one image and decoding the encoded image information to produce decoded image information. The image decoder also includes a de-block filter capable of identifying a pair of image data blocks represented by the decoded image information and separated by a boundary. The de-block filter is also capable of identifying at least one filter length based on edge contents of at least some of the pixels in the at least one image. In addition, the de-block filter is capable of filtering at least some of the pixels in the pair of image data blocks along the boundary using the at least one identified filter length.

In a third embodiment, a de-block filter includes a block pair selector capable of receiving one or more macroblocks and identifying a pair of image data blocks separated by a boundary. The image data blocks include image information defining multiple pixels in at least one image. The de-block filter also includes an edge analyzer capable of identifying edge contents of at least some of the pixels in the at least one image. The de-block filter further includes a filter length estimator capable of identifying at least one filter length based on the edge contents. In addition, the de-block filter includes a filter bank capable of filtering at least some of the pixels in the pair of image data blocks along the boundary using the at least one identified filter length.

In a fourth embodiment, an apparatus includes an interface capable of receiving encoded image information defining multiple pixels in at least one image. The apparatus also includes an image decoder capable of decoding the encoded image information to produce decoded image information and identifying a pair of image data blocks separated by a boundary. The image decoder is also capable of identifying at least one filter length based on edge contents of at least some of the pixels in the at least one image. In addition, the image decoder is capable of filtering at least some of the pixels in the pair of image data blocks along the boundary using the at least one identified filter length.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
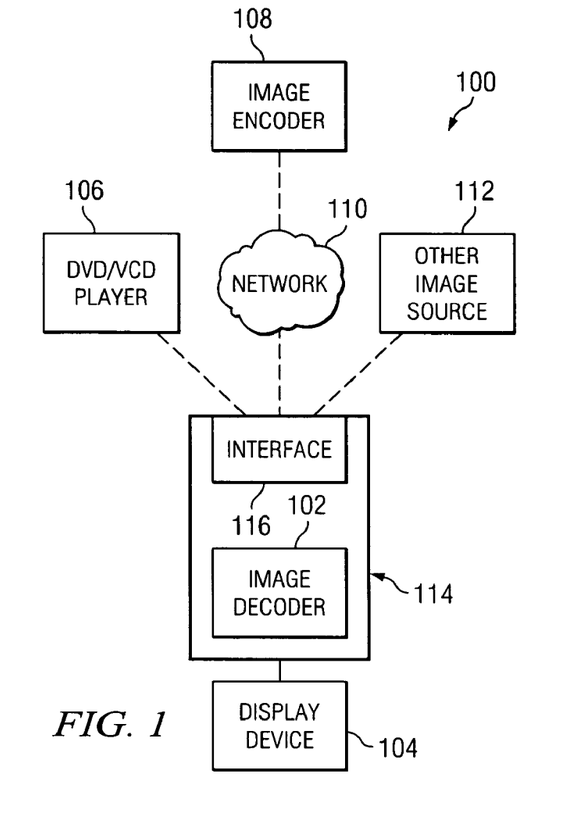
FIG. 1 illustrates an example image processing system according to one embodiment of this disclosure.

FIG. 1 illustrates an example image processing system 100 according to one embodiment of this disclosure. The embodiment of the image processing system 100 shown in FIG. 1 is for illustration only. Other embodiments of the image processing system 100 may be used without departing from the scope of this disclosure.

Figure 2:
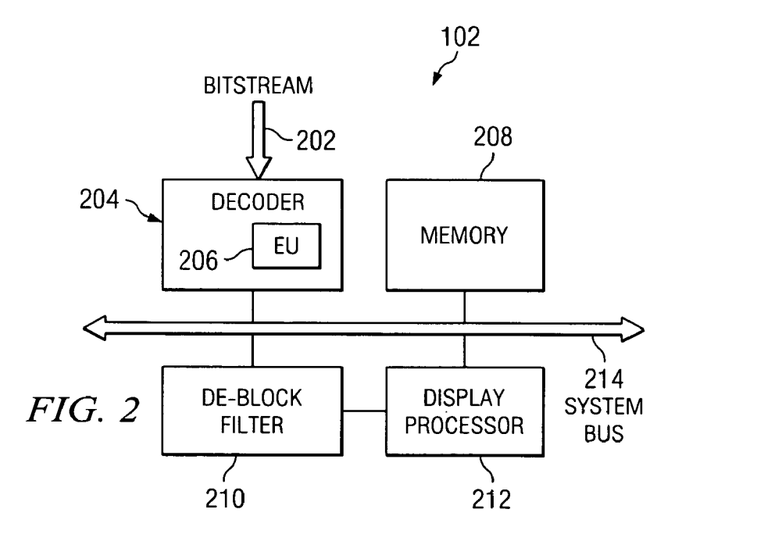
FIG. 2 illustrates an example image decoder according to one embodiment of this disclosure.

As shown in FIG. 1, the image processing system 100 includes an image decoder 102. The image decoder 102 receives and decodes encoded image information. For example, the image decoder 102 could receive and decode video image information encoded using a Moving Picture Experts Group ("MPEG") encoding standard, such as MPEG-1, MPEG-2, or MPEG-4. As another example, the image decoder 102 could receive and decode still image information encoded using a Joint Photographic Experts Group ("JPEG") encoding standard. The image decoder 102 includes any hardware, software, firmware, or combination thereof for decoding encoded image information. An example embodiment of the image decoder 102 is shown in FIG. 2, which is described below.

A display device 104 is coupled to the image decoder 102. In this document, the term "couple" and its derivatives refer to any direct or indirect communication between two or more elements, whether or not those elements are in physical contact with one another. The display device 104 presents one or more images that are decoded and provided by the image decoder 102. For example, the display device 104 could display a series of images forming a decoded video sequence. As another example, the display device 104 could display decoded still photographs or other non-video images. The display device 104 could also present other information, such as audio information accompanying a video sequence. The display device 104 includes any hardware, software, firmware, or combination thereof for presenting decoded images to viewers, such as a television or a computer display.

The encoded image information received by the image decoder 102 could originate from one or multiple sources. In the illustrated example, the image decoder 102 could receive encoded image information from a digital video disk ("DVD")/video compact disc ("VCD") player 106. The DVD/VCD player 106 provides encoded video information and other information to the image decoder 102, such as video information associated with a movie. The image information from the DVD/VCD player 106 could be encoded using any suitable encoding standard. The DVD/VCD player 106 represents any suitable device capable of reading encoded video information from a DVD or VCD disc.

As another example, the image decoder 102 could receive encoded image information from an image encoder 108 over a network 110. The image encoder 108 could provide any encoded image information to the image decoder 102. For example, the image encoder 108 could represent a video server capable of encoding and streaming a video bitstream to the image decoder 102 over the network 110. The image encoder 108 could also represent a device capable of providing encoded still images or other non-video images to the image decoder 102. The image encoder 108 includes any hardware, software, firmware, or combination thereof for encoding image information. Also, the network 110 represents any suitable wireline network, wireless network, or combination of networks capable of transporting information between the image encoder 108 and the image decoder 102. As a particular example, the image encoder 108 could represent a device that encodes video information for transmission over a satellite, cable, or other television network 110.

As yet another example, the image decoder 102 could receive encoded image information from any other image source 112. The other image sources 112 could represent any other suitable source(s) of image information. For example, the other image sources 112 could represent digital cameras, digital camcorders, satellite television receivers, cable television receivers, or broadcast or other television receivers.

As shown in FIG. 1, the image decoder 102 could form part of an apparatus 114 that includes an interface (I/F) 116. The interface 116 represents an interface that allows the image decoder 102 to receive image information from one or more of the image sources. For example, the interface 116 could represent a connector that allows the image decoder 102 to be coupled to the DVD/VCD player 106 or other image source 112 using a video cable or other cable. The interface 116 could also represent a tuner that receives television or other broadcast signals. As particular examples, the image decoder 102 could reside within an apparatus 116 such as a cable set-top box, satellite receiver, or other television receiver.

In some embodiments, images represented by the encoded information received at the image decoder 102 are encoded by dividing the images into blocks. Conventional image decoders often create distortions or "artifacts" in a decoded image. For example, distortions along the borders of the blocks are referred to as "blocking artifacts."

In one aspect of operation, the image decoder 102 decodes the received information representing an image. The image decoder 102 then uses an adaptive de-block filtering system to filter the image and at least partially reduce blocking artifacts in the image. In particular embodiments, the de-block filtering system includes a filter bank that contains a set of multi-tap filters (such as low pass filters). The de-block filtering system then selects and applies one of the filters from the filter set to selected pixels along a block boundary. The selected filter and the selected pixels are chosen based on the distance of an edge in the image to the block boundary. This allows the de-block filtering system to reduce or remove blocking artifacts in an image while maintaining the sharpness of edges and other details in the image being filtered.

Although FIG. 1 illustrates one example of an image processing system 100, various changes may be made to FIG. 1. For example, FIG. 1 illustrates one example environment in which the image decoder 102 may operate. The image decoder 102 could be used in any other environments or systems. Also, the functional division of FIG. 1 is for illustration only. Various components in FIG. 1 may be combined or omitted and additional components could be added according to particular needs. As examples, the image decoder 102 could be integrated into the display device 104, the DVD/VCD player 106, or another image source 112 such as a satellite, cable, broadcast, or other television receiver.

FIG. 2 illustrates an example image decoder 102 according to one embodiment of this disclosure. The embodiment of the image decoder 102 is for illustration only. Other embodiments of the image decoder 102 may be used without departing from the scope of this disclosure. Also, for ease of explanation, the image decoder 102 is described as operating in the system 100 of FIG. 1. The image decoder 102 could be used in any other system.

In the illustrated example, the image decoder 102 receives a digital bitstream 202. The bitstream 202 represents a stream of video image information, still image information, or other image information. The bitstream 202 could, for example, be received from a tuner 114 or other source of image information.

The bitstream 202 is provided to a decoder 204. The decoder 204 decodes one or more images represented by information in the bitstream 202. For example, the decoder 204 could implement MPEG decoding, such as MPEG-1, MPEG-2, or MPEG-4 decoding, to decode video images. The decoder 204 could also implement International Telecommunications Union—Telecommunication ("ITU-T") H.263 or H.264 video decoding. The decoder 204 could further implement Windows Media Video ("WMV") or Society of Motion Picture and Television Engineers ("SMPTE") VC9 video decoding. In addition, the decoder 204 could implement JPEG decoding to decode still images. The decoder 204 includes any hardware, software, firmware, or combination thereof for decoding image information.

In this example, the decoder 204 includes an extraction unit ("EU") 206. The extraction unit 206 extracts various encoding parameters from the bitstream 202. The extracted parameters represent information used by the decoder 204 to decode the bitstream 202. For example, the extraction unit 206 could extract quantization parameters, a macroblock coding type, and/or other parameters from the bitstream 202. These parameters are used by the decoder 204 to decode image information in the bitstream 202. The extraction unit 206 includes any hardware, software, firmware, or combination thereof for extracting encoding parameters.

The decoded image information from the decoder 204 and the encoding parameters from the extraction unit 206 are stored in a memory 208. For example, in some embodiments, decoded image information may be stored as pixel arrays in the memory 208. The memory 208 represents any memory or memories capable of storing and facilitating retrieval of information. As examples, the memory 208 could represent a random access memory, hard disk drive, or other volatile and/or non-volatile memory or memories.

The image information and encoding parameters stored in the memory 208 may be retrieved and processed by a de-block filter 210. The de-block filter 210 processes image information to reduce or remove blocking artifacts from decoded images. In some embodiments, the de-block filter 210 uses a filter bank, which contains multiple multi-tap filters. The de-block filter 210 selects the pixels to be filtered and the filter to be used. The de-block filter 210 then filters the selected pixels with the selected filter.

Figure 3:
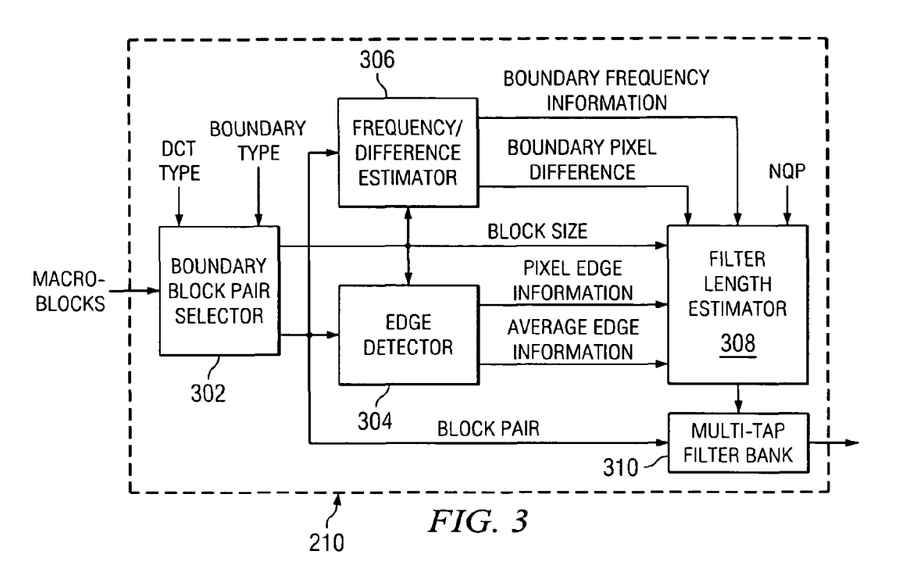
FIG. 3 illustrates an example de-block filter in an image decoder according to one embodiment of this disclosure.

In some embodiments, the de-block filter 210 selects the pixels and the filter based on the distance of an edge in the decoded image from a block border. The identification of the edge(s) in the image and the calculation of the distance(s) may be based on two-dimensional global and local characteristics of the image. In particular embodiments, the de-block filter 210 uses the encoding parameters identified by the extraction unit 206 to identify the edge(s) and the distance(s). This may allow the de-block filter 210 to adaptively filter both frame-coded and field-coded blocks of image data. The de-block filter 210 includes any hardware, software, firmware, or combination thereof for at least partially reducing blocking artifacts in one or more images. An example embodiment of the de-block filter 210 is shown in FIG. 3, which is described below.

The filtered image information from the de-block filter 210 is provided to a display processor 212. The display processor 212 processes the image information for presentation on the display device 104. For example, the display processor 212 could perform de-interlacing, scaling, cropping, image enhancement, brightness and contrast control, and color space conversion operations. The processed image information may then be provided for storage in the memory 208 for retrieval and display by the display device 104. The display processor 212 includes any suitable processor or controller for processing image information for presentation.

The various components in the image decoder 102 communicate over a system bus 214. The system bus 214 represents any suitable bus capable of transporting information between components of the image decoder 102. The system bus 214 may also have any suitable size, such as a 32-bit or 64-bit bus.

Although FIG. 2 illustrates one example of an image decoder 102, various changes may be made to FIG. 2. For example, the functional division of the image decoder 102 shown in FIG. 2 is for illustration only. Various components in FIG. 2 may be combined or omitted and additional components could be added according to particular needs.

FIG. 3 illustrates an example de-block filter 210 in an image decoder according to one embodiment of this disclosure. The embodiment of the de-block filter 210 is for illustration only. Other embodiments of the de-block filter 210 may be used without departing from the scope of this disclosure. Also, for ease of explanation, the de-block filter 210 is described as residing within the image decoder 102 of FIG. 2 operating in the system 100 of FIG. 1. The de-block filter 210 could be used in any other device and in any other system.

In the illustrated example, the de-block filter 210 includes a boundary block pair selector 302. The boundary block pair selector 302 receives one or more macroblocks. For example, the boundary block pair selector 302 could receive a current macroblock being processed and any neighboring macroblocks. The boundary block pair selector 302 then analyzes the macroblocks and selects a pair of blocks from the macroblocks. The pair of blocks could reside within the same macroblock or from different macroblocks. The boundary block pair selector 302 then outputs the pair of blocks and a size of the blocks. The pair of blocks to be filtered includes a boundary between the blocks, such as a horizontal boundary or a vertical boundary. The boundary block pair selector 302 includes any hardware, software, firmware, or combination thereof for selecting a pair of image data blocks.

In the illustrated example, the boundary block pair selector 302 selects the pair of blocks based on the type of macroblock and the type of boundary between the pair of blocks. The macroblock type could be based, for example, on the dct_type parameter identified by the extraction unit 206. The type of boundary between the blocks represents either an intra-macroblock boundary (two blocks in the same macroblock) or an inter-macroblock boundary (two blocks in the different macroblocks). The boundary block pair selector 302 could select the pair of blocks in any other suitable manner.

The pair of blocks selected by the boundary block pair selector 302 and the block size are provided to an edge detector 304. The edge detector 304 analyzes the selected blocks to identify various characteristics associated with the edge contents of the blocks. The phrase "edge contents" refers to any edges contained in all or a portion of an image being processed, even if an image does not contain any edges. For example, the edge detector 304 may identify local edge information associated with each pixel in the block pair and average edge information associated with the entire block pair. The edge detector 304 then outputs the edge information for each pixel and the average edge information. The edge information identifies the likelihood that a pixel lies along an edge in the image. The edge detector 304 includes any hardware, software, firmware, or combination thereof for identifying information associated with any edges in a pair of image data blocks. In this document, the term "each" refers to every of at least a subset of the identified items.

The pair of image data blocks selected by the boundary block pair selector 302 and the block size are also provided to a frequency/difference estimator 306. The frequency/difference estimator 306 identifies frequency information about the pixels around the boundary between the block pair. The frequency/difference estimator 306 also identifies a difference between the pixels along the boundary. The frequency/difference estimator 306 then outputs two flags based on the identified pixel difference and the identified frequency information. The flags allow the de-block filter 210 to preserve image edges that occur on or near the boundary between the block pair. The flags also prevent the de-block filter 210 from smoothing texture regions on or near the boundary between the block pair. The frequency/difference estimator 306 includes any hardware, software, firmware, or combination thereof for identifying differences between pixels and frequency information associated with pixels.

The block size from the boundary block pair selector 302, the edge information from the edge detector 304, and the flags from the frequency/difference estimator 306 are provided to a filter length estimator 308. The filter length estimator 308 also receives a normalized quantization parameter ("NQP"). The normalized quantization parameter may be based on the various encoding parameters extracted by the extraction unit 206. The filter length estimator 308 identifies a distance of an edge in the block pair to the boundary of the block pair. The filter length estimator 308 then uses this distance to output a value identifying a filter to be used to filter the block pair. The filter length estimator 308 includes any hardware, software, firmware, or combination thereof for selecting a filter based on a distance between an image edge and a block boundary.

The pair of image data blocks selected by the boundary block pair selector 302 is received by a multi-tap filter bank 310. The filter bank 310 represents a set of filters, such as a set of low pass filters. One of the filters in the filter bank 310 is selected based on the output of the filter length estimator 308, and the selected filter is used to filter pixels in the block pair. The filter bank 310 represents any hardware, software, firmware, or combination thereof providing multiple filters for filtering blocks of image data.

The following description describes the operation of a particular embodiment of the de-block filter 210 shown in FIG. 3. Details in the following description are for illustration and explanation only. Other embodiments of the de-block filter 210 that operate in other ways may be used without departing from the scope of this disclosure.

Figure 4A:
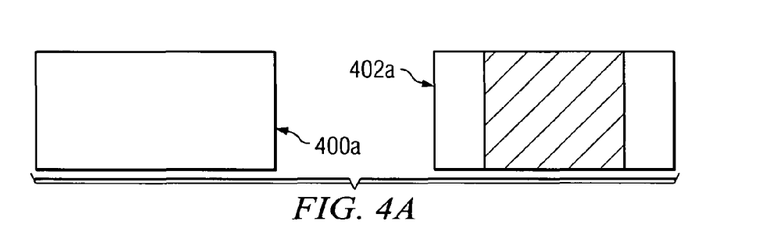
FIGS. 4A through 4C illustrate examples of blocking artifact filtering according to one embodiment of this disclosure.
Figure 4B:
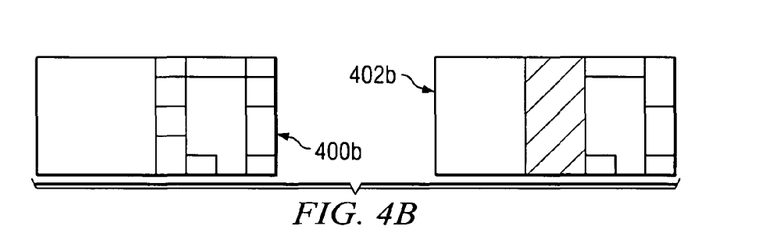
Figure 4C:
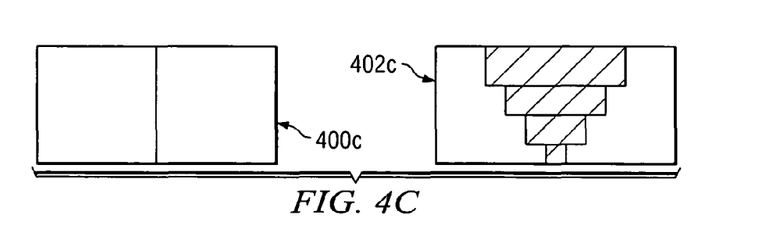

In general, macroblocks received by the de-block filter 210 define multiple blocks of image data. The boundary between two of the blocks could suffer from various discontinuities or blocking artifacts. Example blocking artifacts 400a-400c are shown in FIGS. 4A through 4C. In particular, FIG. 4A illustrates a blocking artifact 400a in a monotone region of an image, FIG. 4B illustrates a blocking artifact 400b in a texture region of the image, and FIG. 4C illustrates a blocking artifact 400c along or near an edge in the image.

To reduce these blocking artifacts 400a-400c while preserving edges and texture regions in an image, the de-block filter 210 selects the pixels to be filtered in the blocks based on the behavior of the pixels around the block boundary. For blocking artifacts 400a in monotone regions of an image, the de-block filter 210 strongly filters a larger number of pixels near the block boundary. For blocking artifacts 400b in texture regions of an image, the de-block filter 210 filters a smaller number of pixels, such as the pixels only along the block boundary, to avoid smoothing the details of the texture. If the local features of the pixels along the block boundary are similar to the features of neighboring pixels, the pixels along the block boundary may not be filtered at all. For blocking artifacts 400c along or near edges in images, the de-block filter 210 filters pixels without overlapping the edges in the image.

The de-block filter 210 receives and processes both luminance and chrominance data from the macroblocks. For example, for each macroblock being filtered, vertical block boundaries may be filtered first from left to right, followed by horizontal block boundaries from top to bottom. For luminance data, the blocks represent 8×8 blocks of data, 16 samples (8 in each of two rows) are filtered from left to right for vertical boundaries, and 16 samples (8 in each of two columns) are filtered from top to bottom for horizontal boundaries. For chrominance data, 8 samples (from a single row) are filtered from left to right for vertical boundaries, and 8 samples (from a single column) are filtered from top to bottom for horizontal boundaries.

An image may be represented by multiple macroblocks, and the macroblocks could be filtered in order from the top left to the bottom right. When this occurs, pixels above and to the left of a macroblock currently being processed may have been modified by the de-block filter 210 when processing previous macroblocks. These pixels may not be further modified by the de-block filter 210 during filtering of the current macroblock. Also, pixels modified during filtering of vertical boundaries of a macroblock may be used as input for filtering the horizontal boundaries for that macroblock.

In general, the de-block filter 210 operates on a row-by-row basis for vertical boundaries and a column-by-column basis for horizontal boundaries. The de-block filter 210 identifies the number of pixels per row/column to be filtered and then filters those pixels. The number of pixels per row/column could remain constant for an entire boundary or vary depending on the contents of an image being filtered.

Figure 5:
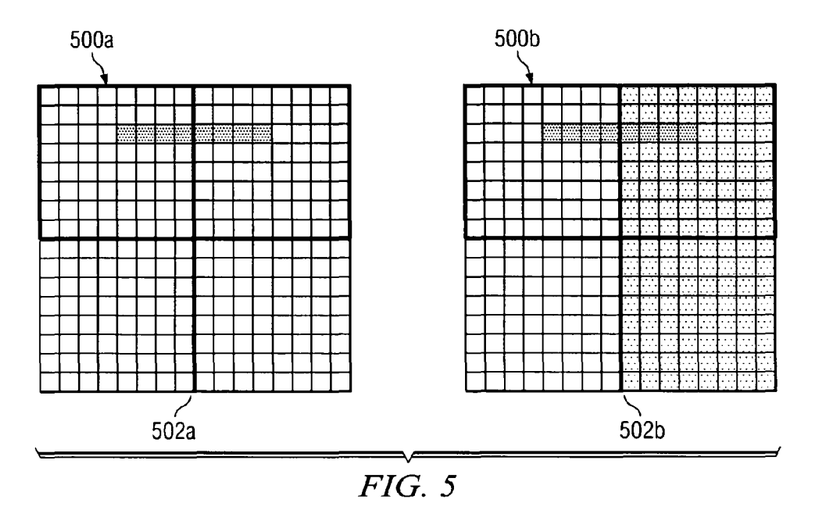
FIG. 5 illustrates examples of vertical block boundaries according to one embodiment of this disclosure.

The boundary block pair selector 302 identifies a pair of 8×8 blocks to be filtered by the de-block filter 210. The 8×8 blocks could be separated by a vertical boundary or a horizontal boundary. As shown in FIG. 5, a 16×8 pixel array 500a or 500b is formed by two 8×8 blocks of image data, where the blocks are separated by a vertical boundary 502a or 502b. This is true whether the pixel array contains 8×8 blocks from the same macroblock (pixel array 500a) or 8×8 blocks from different macroblocks (pixel array 500b).

As shown in FIGS. 6-9, the de-block filter 210 processes image data blocks separated by a horizontal boundary differently based on whether the blocks are from field-coded or frame-coded macroblocks and whether the blocks are from a single macroblock or multiple macroblocks. The block pair selected by the boundary block pair selector 302 represents either two 8×8 blocks forming an 8×16 pixel array or two 8×4 blocks forming an 8×8 pixel array.

Figure 6:
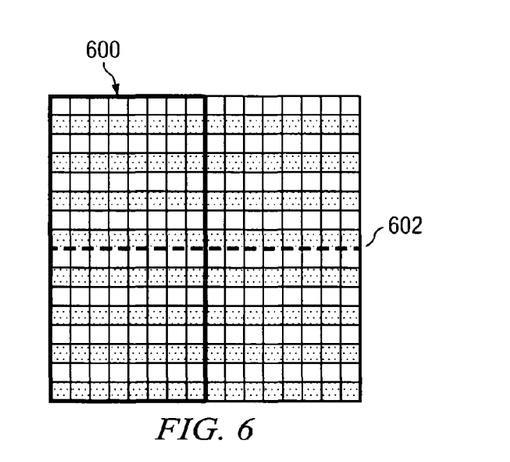
FIG. 6 illustrates an example intra-macroblock horizontal boundary of a field-coded block pair according to one embodiment of this disclosure.

As shown in FIG. 6, if the 8×8 blocks of image data are in a single macroblock and the macroblock is field-coded (interlaced), a pixel array 600 is formed from 8×8 blocks separated by an intra-macroblock horizontal boundary 602. In some embodiments, the pixel array 600 is not filtered. In FIG. 6, the interlacing of the macroblock is illustrated as different shading for every other line in the macroblock.

Figure 7:
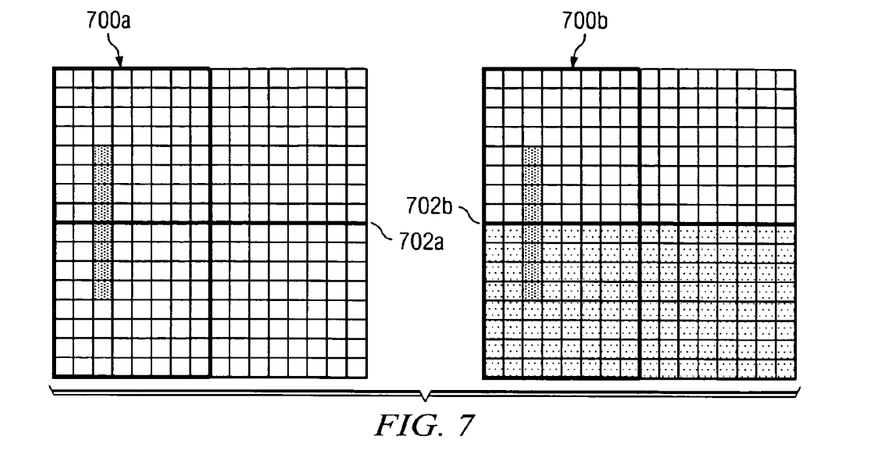
FIG. 7 illustrates examples of horizontal boundaries of a frame-coded block pair according to one embodiment of this disclosure.

As shown in FIG. 7, if the 8×8 blocks of image data are both frame-coded, an 8×16 pixel array 700a or 700b is formed by two 8×8 blocks, where the blocks are separated by a horizontal boundary 702a or 702b. This is true whether the pixel array contains 8×8 blocks from the same macroblock (pixel array 700a) or 8×8 blocks from different macroblocks (pixel array 700b).

Figure 8:
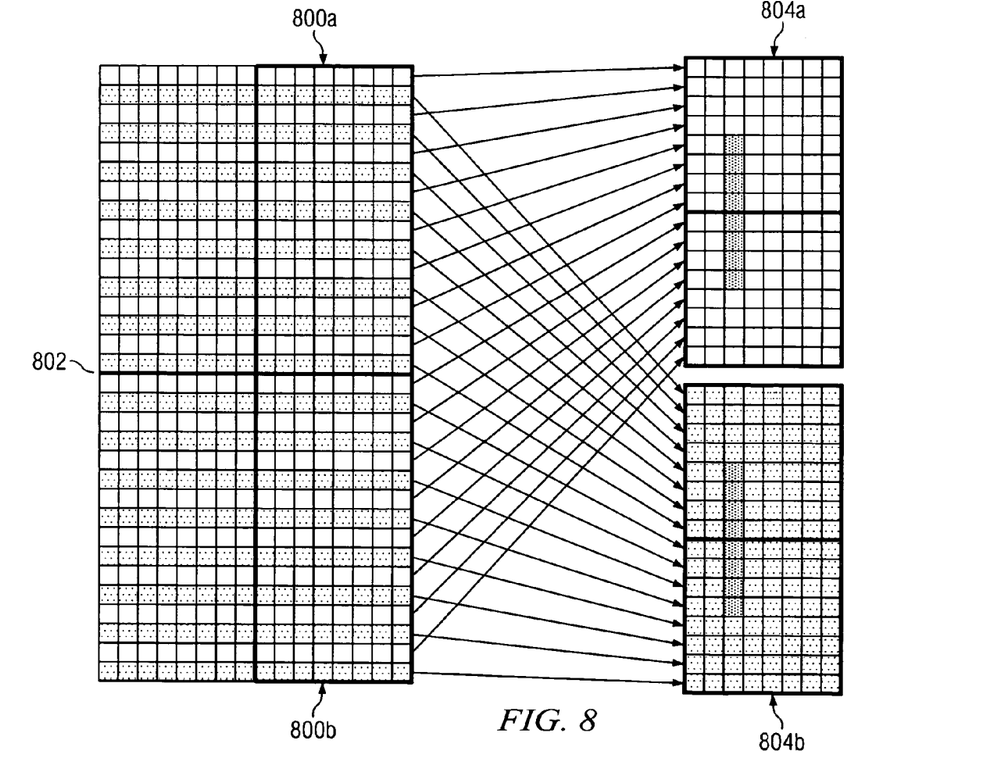
FIG. 8 illustrates an example inter-macroblock horizontal boundary of a field-coded block pair according to one embodiment of this disclosure.

As shown in FIG. 8, two 8×16 blocks 800a-800b of image data in different field-coded macroblocks may be separated by a horizontal boundary 802. The boundary block pair selector 302 uses the two 8×16 field-coded blocks to generate two 8×16 pixel arrays 804a-804b, where the pixel array 804a contains even parity lines from the blocks 800a-800b and the pixel array 804b contains odd parity lines from the blocks 800a-800b.

Figure 9:
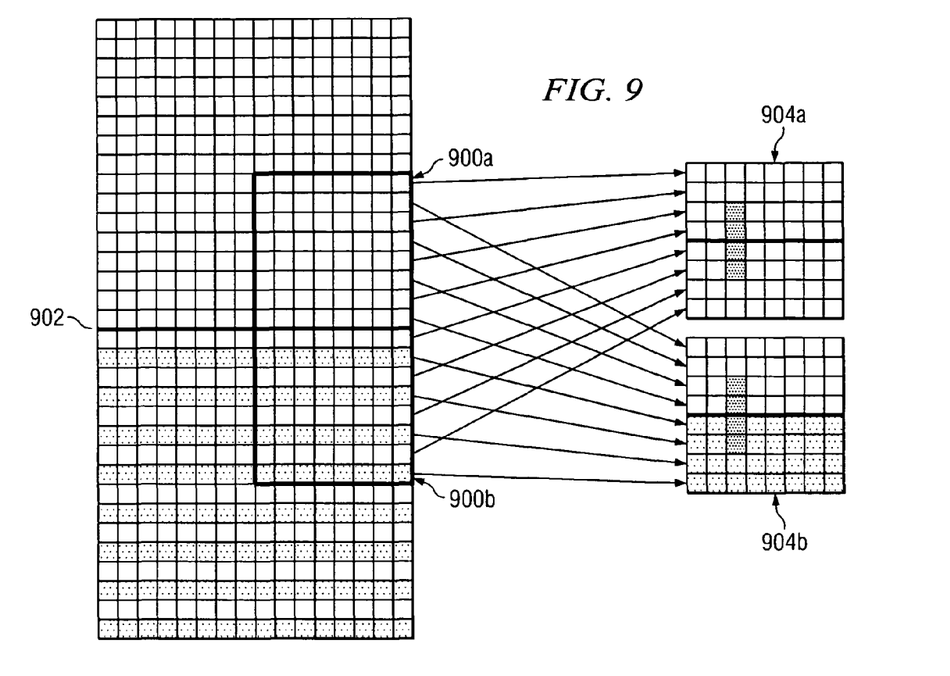
FIG. 9 illustrates an example inter-macroblock horizontal boundary of a field-coded block and a frame-coded block according to one embodiment of this disclosure.

As shown in FIG. 9, an 8×8 block 900a of image data in a frame-coded macroblock may be separated from an 8×8 block 900b of image data in a field-coded macroblock by a horizontal boundary 902. The boundary block pair selector 302 uses the 8×8 blocks 900a-900b to generate two 8×8 pixel arrays 904a-904b. The pixel array 904a contains even parity lines from the blocks 900a-900b, and the pixel array 904b contains odd parity lines from the blocks 900a-900b.

The boundary block pair selector 302 outputs a block pair using the macroblock type (frame-coded or field-coded) and the boundary type. A vertical boundary (whether intra- or inter-macroblock) causes the boundary block pair selector 302 to output the pixel array 500a or 500b. An intra-macroblock horizontal boundary in a field-coded macroblock causes the boundary block pair selector 302 to output the pixel array 600. An intra- or inter-macroblock horizontal boundary in a frame-coded macroblock causes block pair selector 302 to output the pixel array 700a or 700b. An inter-macroblock horizontal boundary between field-coded macroblocks causes the boundary block pair selector 302 to output two pixel arrays 804a-804b. An inter-macroblock horizontal boundary between a field-coded macroblock and a frame-coded macroblock causes the boundary block pair selector 302 to output two pixel arrays 904a-904b.

A pixel array containing data from two blocks is provided by the boundary block pair selector 302 to the edge detector 304. The edge detector 304 applies an edge operator to each pixel in the pixel array to identify the each pixel's local edge information. The edge information for all of the pixels in a block is then used to identify global edge information for that block.

In some embodiments, the edge detector 304 applies a vertical edge operator to calculate vertical edge information for each block. For example, the edge detector 304 could operate using the following equations:

$$S_V = \begin{bmatrix} -1 & 1 \\ -2 & 2 \\ -1 & 1 \end{bmatrix} \quad (1)$$

$$VX_{i,j} = (X_{i-1,j} + 2*X_{i,j} + X_{i+1,j}) - (X_{i-1,j-1} + 2*X_{i,j-1} + X_{i+1,j-1}) \quad (2)$$

$$V_s = \frac{1}{N}\sum_{i,j=1}^{m,n} VX_{i,j} \quad (3)$$

$$i = 1, \ldots, m \quad (4)$$

$$j = 1, \ldots, n \quad (5)$$

$$N = n*m \quad (6)$$

where $S_V$ represents the vertical edge operator, $VX_{i,j}$ represents the local vertical edge information for the pixel at position (i,j), $X_{i,j}$ represents the value of the pixel at position (i,j), and $V_S$ represents the global vertical edge information for the block. The values of m and n depend on the size of the block being processed. As example, m=8 and n=8 for 8×8 blocks, and m=4 and n=8 for 8×4 blocks.

Figure 10:
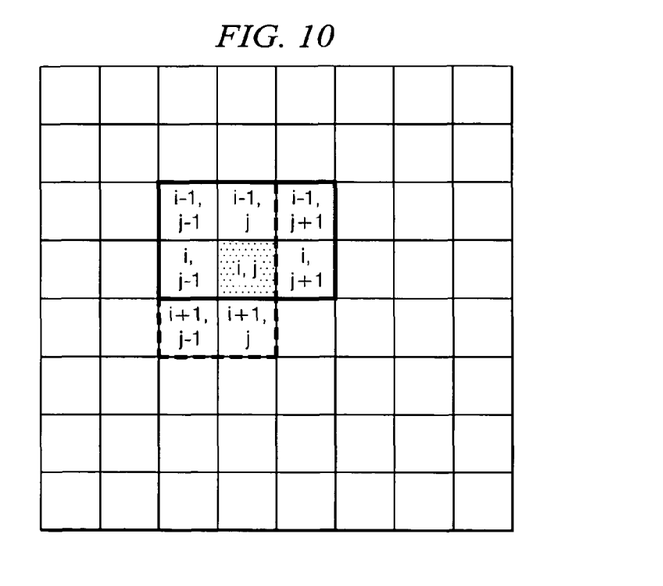
FIG. 10 illustrates example pixels involved in edge measurements according to one embodiment of this disclosure.

The edge detector 304 also applies a horizontal edge operator to calculate horizontal edge information for each block. For example, the edge detector 304 could operate using the following equations:

$$S_H = \begin{bmatrix} -1 & -2 & -1 \\ 1 & 2 & 1 \end{bmatrix} \quad (7)$$

$$HX_{i,j} = (X_{i,j-1} + 2*X_{i,j} + X_{i,j+1}) - (X_{i-1,j-1} + 2*X_{i-1,j} + X_{i-1,j+1}) \quad (8)$$

$$H_s = \frac{1}{N}\sum_{i,j=1}^{m,n} HX_{i,j} \quad (9)$$

where $S_H$ represents the horizontal edge operator, $HX_{i,j}$ represents the local horizontal edge information for the pixel at position (i,j), and $H_S$ represents the global horizontal edge information for the block. FIG. 10 illustrates the pixels involved in these calculations. The shaded pixel represents the current pixel of interest (pixel at location (i,j)), the solid box represents the pixels involved in Equation (8), and the dashed box represents the pixels involved in Equation (2).

The pixel array containing the two image data blocks is also provided by the boundary block pair selector 302 to the frequency/difference estimator 306. The frequency/difference estimator 306 analyzes the pixel array and outputs two flags, diff_flag and freq_flag. The freq_flag value represents frequency information about the pixels around the boundary between the blocks. The diff_flag represents the absolute difference between the pixels along the block boundary.

Figure 11:
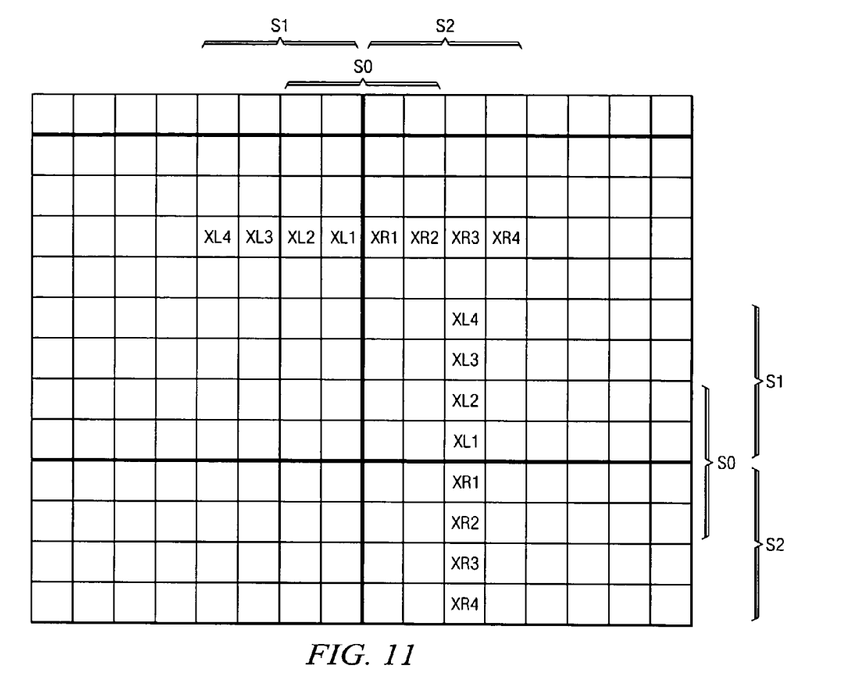
FIG. 11 illustrates example pixel arrays in block pairs according to one embodiment of this disclosure.

The frequency information may be identified in any suitable manner. For example, the frequency/difference estimator 306 could use four-pixel pixel arrays from the block as shown in FIG. 11. The four-pixel pixel arrays shown in FIG. 11 correspond to the darkened pixels shown in FIGS. 5-9.

In this example, a high frequency anti-symmetric component (denoted $a_3$ below) of the four-pixel array is the major component providing the texture feature and blocky effect of the four-pixel array. As a result, this component may be used as a reference to determine if filtering should be applied in a texture region.

A local array $S_0$ of pixels and two neighbor arrays $S_1$ and $S_2$ of pixels are defined in the block pair. The frequency/difference estimator 306 identifies high frequency anti-symmetric components $a_{3,0}$, $a_{3,1}$, and $a_{3,2}$ of the pixel arrays $S_0$, $S_1$ and $S_2$, respectively. Values of $a_{3,0}$, $a_{3,1}$, and $a_{3,2}$ may be determined using the following equations:

$$a_{3,0} = ([2\ -5\ 5\ -2] \cdot [XL2\ XL1\ XR1\ XR2]^T)//8, \quad (10)$$

$$a_{3,1} = ([2\ -5\ 5\ -2] \cdot [XL4\ XL3\ XL2\ XL1]^T)//8, \quad (11)$$

$$a_{3,2} = ([2\ -5\ 5\ -2] \cdot [XR1\ XR2\ XR3\ XR4]^T)//8, \quad (12)$$

where [2 −5 5 −2] represents an approximate DCT kernel, XL1-XL4 and XR1-XR4 represent pixels in the row or column of FIG. 11, and T represents an array transpose.

The frequency/difference estimator 306 uses the values of $a_{3,0}$, $a_{3,1}$, and $a_{3,2}$ to set freq_flag. For example, the frequency/difference estimator 306 may use the following equation:

$$abs(a_{3,0}) < \text{Min}(abs(a_{3,1}), abs(a_{3,2})) \quad (13)$$

If this condition is true, this may indicate that the block boundary in $S_0$ does not affect the texture features of this region. Based on this, the boundary should not be filtered, and freq_flag is set to 0. Otherwise, the boundary should be filtered, and freq_flag is set to 1.

The frequency/difference estimator 306 sets the value of diff_flag using a normalized quantization parameter. The diff_flag is used to prevent filtering when the difference in pixels along the block boundary is larger than a threshold. In some embodiments, the normalized quantization parameter ("NQP") is used as the threshold because the presence of blocking artifacts is often related to the normalized quantization parameter. The frequency/difference estimator 306 may operate using the following equation:

$$d = abs(XL1 - XR1) \quad (14)$$

where d represents the difference. If d>NQP, the boundary should not be filtered, and diff_flag is set to 0. Otherwise, the boundary should be filtered, and diff_flag is set to 1.

In some embodiments, the parameters provided by the extraction unit 206 are used to identify the normalized quantization parameter. For example, values for quan_scale and quan_norm may be identified by the extraction unit 206. The value quan_scale identifies the quantization step size for an image, and the value quan_norm identifies the normalized quantization parameter. The value of quan_scale could be calculated using the formula:

$$quan\_scale = \begin{cases} quan\_scale\_code \times 2 & quan\_scale\_type = linear \\ non\_linear\_quan\_scale[quan\_scale\_code] & quan\_scale\_type = non\_linear \end{cases} \quad (15)$$

where quan_scale_code, quan_scale_type, and non_linear_quan_scale represent parameters received from the extraction unit 206. Also, for intra-coded macroblocks, the value of quan_norm could be calculated as:

$$quan\_norm = quan\_scale \times [quan\_matrix[0][1] + quan\_matrix[1][0]]/32; \quad (16)$$

where quan_matrix represents another parameter received from the extraction unit 206. For inter-coded macroblocks, the value of quan_norm could be calculated as:

$$quan\_norm = quan\_scale \times quan\_matrix[0][0]/16. \quad (17)$$

The value of quan_norm could be calculated by any component of the image decoder 102, such as the decoder 204, the extraction unit 206, or a component of the de-block filter 210.

Figure 12:
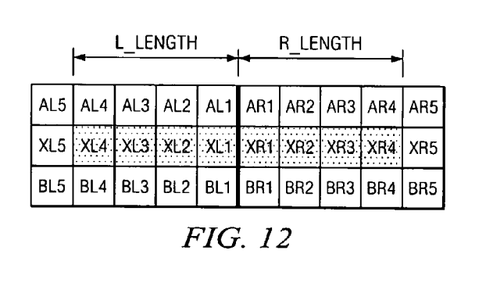
FIG. 12 illustrates an example filter length estimation according to one embodiment of this disclosure.
Figure 13:
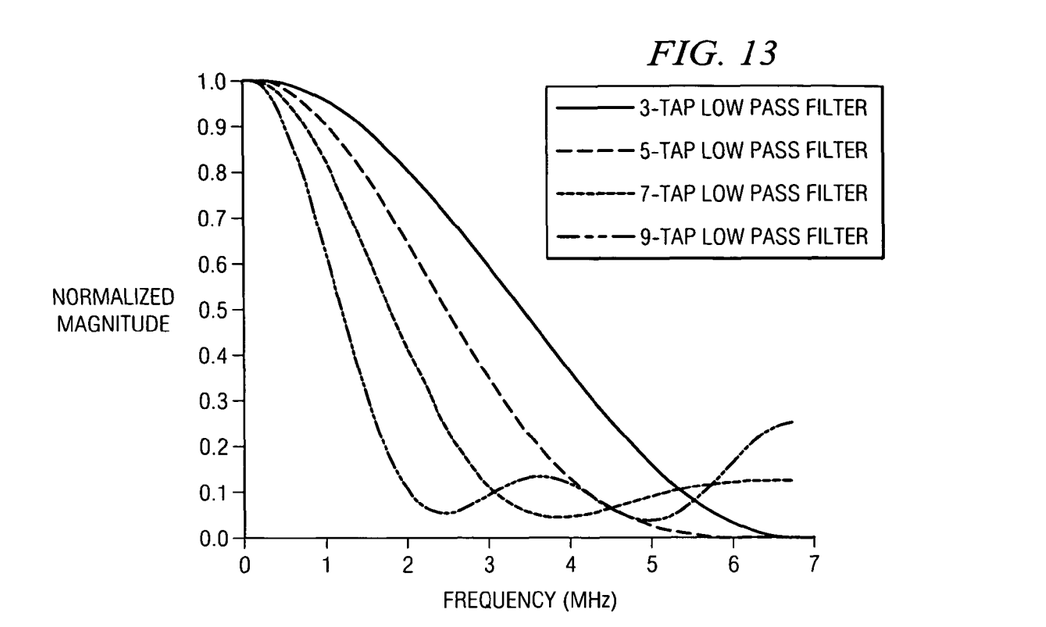
FIG. 13 illustrates example frequency responses of filters in a filter bank according to one embodiment of this disclosure.

The filter length estimator 308 calculates the distance in a row/column from an image edge to a block boundary. As shown in FIG. 12, the filter length estimator 308 may operate on pixels having a vertical boundary using the equations:

$$L\_length = \begin{cases} 4 & VL_s < monoth \\ i & VXL_i > VL_s \end{cases} \quad i = 1, 2, 3 \quad (18)$$

$$R\_length = \begin{cases} 4 & VR_s < monoth \\ j-1 & VXR_i > VR_s \end{cases} \quad j = 2, 3, 4 \quad (19)$$

where L_length represents the filter length on one side of the block boundary, R_length represents the filter length on another side of the block boundary, $VXL_i$ represents the vertical edge information (from Equation (2) above) for one of the pixels $XL_i$ in FIG. 12, $VXR_i$ represents the vertical edge information (from Equation (2) above) for one of the pixels $XR_i$ in FIG. 12, $VL_S$ represents the global vertical edge information (from Equation (3) above) for the block on one side of the boundary, $VR_S$ represents the global vertical edge information (from Equation (3) above) for the block on another side of the boundary, and monoth is a monotone threshold to identify if a block is monotone.

The filter length estimator 308 then identifies a filter length to be used to filter the row of the pixel array using the L_length and R_length values. For example, the filter length estimator 308 may operate using the formula:

$$F\_length = Min(L\_length, R\_length) \quad (20)$$

where F_length represents the filter length to be used to filter a row having a vertical boundary.

In some embodiments, the value of F_length is sent to the filter bank 310 in most circumstances. However, other values may be sent to the filter bank 310 in special situations. For example, if the boundary between blocks is a horizontal boundary and the blocks reside within a single field-coded macroblock, the value of F_length may be set to 0 (indicating no filtering). Also, if the value of diff_flag is 0, the value of F_length may also be set to 0. Further, if the boundary represents the actual boundary of an image, the value of F_length may be set to 0. In addition, if the value of F_length is 1 and freq_flag is 0, the value of F_length may be set to 0.

The same process described above may be used to identify a filter length to be used to filter a column of pixels with a horizontal boundary. In that case, the block above the horizontal boundary corresponds to the block on the left of the vertical boundary and the block below the horizontal boundary corresponds to the block on the right of the vertical boundary. Also, in particular embodiments, when two 8×4 blocks form the pixel array being processed, the maximum filter length may be limited to a value of 2.

Figure 14:
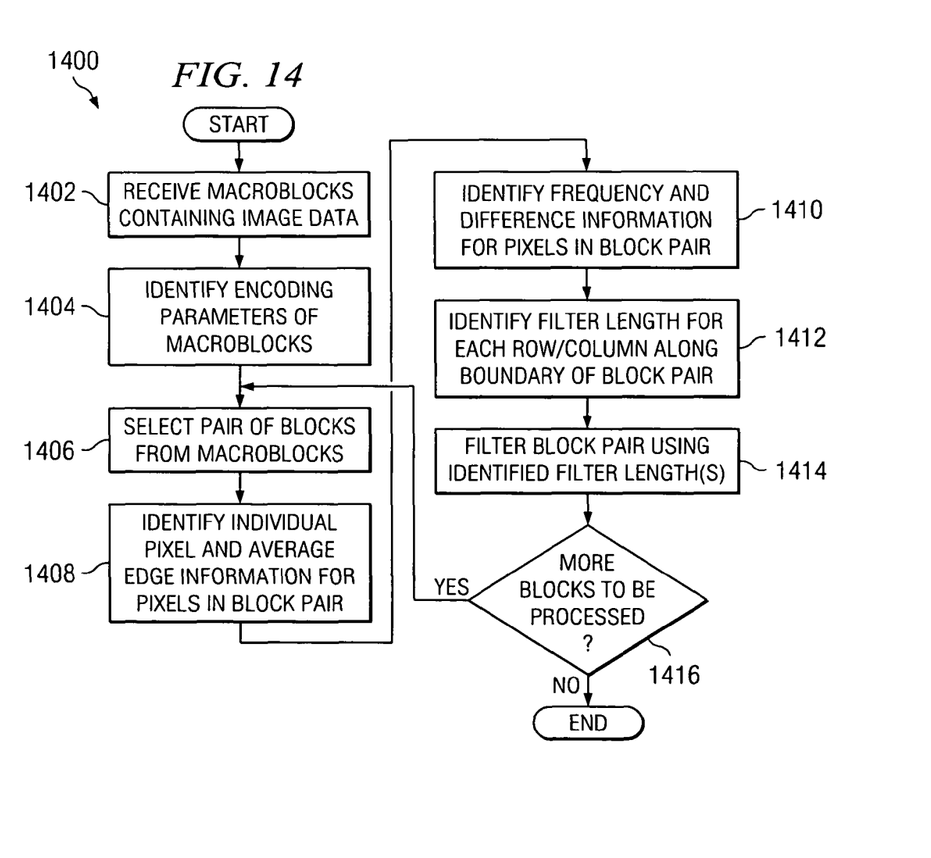
FIG. 14 illustrates an example method for de-block filtering according to one embodiment of this disclosure.

The value of F_length determined by the filter length estimator 308 is sent to the filter bank 310. The filter bank 310 uses the value of F_length to select a filter from a set of filters. The set of filters could, for example, low pass filters. As a particular example, the low pass filters include a nine-tap low pass filter (1 1 2 2 4 2 2 1 1), a seven-tap low pass filter (1 4 6 10 6 4 1), a five-tap low pass filter (1 4 6 4 1), and a three-tap low pass filter (1 2 1). The filter parameters may be determined based on their optimal frequency responses, an example of which is shown in FIG. 14.

In this example, if the value of F_length is 0, the pixels XL1-XL4 and XR1-XR4 are not filtered. If the value of F_length is 1, the pixels XL1 and XR1 are filtered. If the value of F_length is 2, the pixels XL1-XL2 and XR1-XL2 are filtered. If the value of F_length is 3, the pixels XL1-XL3 and XR1-XR3 are filtered. If the value of F_length is 4, the pixels XL1-XL4 and XR1-XR4 are filtered. In particular embodiments, the filtering performed by the filter bank 310 could be defined using the following pseudocode:

```
Switch(filter_length)
{
case 0:
        Bypass;
        break;
case 1:         /* low pass filtering (3-tap) */
        XL1' = (3*XL1+XR1+2)/4;
        XR1' = (XL1+3*XR1+2)/4;
        break;
case 2:         /* low pass filtering (5-tap) */
        XL2' = ((11*XL2+4*XL1+XR1)+8)/16;
        XL1' = ((5*XL2+6*XL1+4*XR1+XR2)+8)/16;
```

-continued

```
        XR1' = (XL2+4*XL1+6*XR1+5*XR2+8)/16;
        XR2' = (XL1+4*XR1+11*XR2+8)/16;
case 3:             /* low pass filtering (7-tap) */
        XL3' = ((21*XL3+6*XL2+4*XL1+XR1)+16)/32;
        XL2' = ((11*XL3+10*XL2+6*XL1+4*XR1+XR2)+16)/32;
        XL1' = ((5*XL3+6*XL2+10*XL1+6*XR1+4*XR2+XR3+16)/32;
        XR1' = ((XL3+4*XL2+6*XL1+10*XR1+6*XR2+5*XR3)+16)/32;
        XR2' = ((XL2+4*XL1+6*XR1+10*XR2+11*XR3)+16)/32;
        XR3' = ((XL1+4*XR1+6*XR2+21*XR3)+16)/32;
        break;
case 4:             /* low pass filtering (9-tap) */
        XL4' = ((10*XL4+2*XL3+2*XL2+XL1+XR1)+8)/16;
        XL3' = ((6*XL4+4*XL3+2*XL2+2*XL1+XR1+XR2)+
        8)/16;
        XL2' = ((4*XL4+2*XL3+4*XL2+2*XL1+2*XR1+XR2+XR3)+
        8)/16;
        XL1' = ((2*XL4+2*XL3+2*XL2+4*XL1+2*XR1+2*XR2+XR3+
        XR4+8)/16;
        XR1' = ((XL4+XL3+2*XL2+2*XL1+4*XR1+2*XR2+2*XR3+
        2*XR4)+8)/16;
        XR2' = ((XL3+XL2+2*XL1+2*XR1+4*XR2+2*XR3+4*XR4)
        +8)/16;
        XR3' = ((XL2+XL1+2*XR1+2*XR2+4*XR3+6*XR4)+8)/16;
        XR4' = ((XL1+XR1+2*XR2+2*XR3+10*XR4)+8)/16;
        break;
}
```

The above description has described the process used to filter up to eight pixels in a single row or column (maximum of four pixels on each side of a horizontal or vertical boundary) of a pixel array. The process may be repeated to filter pixels in all rows or columns along the boundary. As shown in FIGS. 4A through 4C, the number of pixels filtered in each row or column could vary depending on the image data in the block. For example, only a single pixel on each side of a boundary in a textured region might be filtered, whereas different numbers of pixels per row/column along an edge may be filtered.

Although FIG. 3 illustrates one example of a de-block filter 210 in an image decoder, various changes may be made to FIG. 3. For example, the functional division of the de-block filter 210 shown in FIG. 3 is for illustration only. Various components in FIG. 3 may be combined or omitted and additional components could be added according to particular needs. Also, FIGS. 4-14 illustrate various aspects of the operation of the de-block filter 210. The de-block filter 210 could operate in any other suitable manner.

FIG. 14 illustrates an example method 1400 for de-block filtering according to one embodiment of this disclosure. For ease of explanation, the method 1400 is described as being performed by an image decoder 102 of FIG. 2 operating in the system 100 of FIG. 1. The method 1400 could be used by any other device and in any other system.

The image decoder 102 receives macroblocks containing image data at step 1402. This may include, for example, the decoder 204 receiving a bitstream 202 containing a current macroblock being processed and any neighboring macroblocks. The macroblocks could originate from a DVD/VCD player 106, a video encoder 108 communicating over a network 110, or some other image source 112. This may also include the decoder 204 decoding the image data, such as by performing MPEG or JPEG decoding.

The image decoder 102 identifies encoding parameters of the current macroblock at step 1404. This may include, for example, the extraction unit 206 in the decoder 204 identifying encoding parameters used to encode the macroblock. As a particular example, this may include the extraction unit 206 identifying the quan_scale_code, quan_scale_type, non_linear_quan_scale, quan_matrix, macroblock_type, picture_coding_type, and dct_type parameters.

The image decoder 102 selects a pair of image blocks from the macroblocks at step 1406. This may include, for example, the boundary block pair selector 302 selecting a pair of blocks separated by a horizontal boundary or a vertical boundary. This may also include the boundary block pair selector 302 selecting a pair of blocks within a single macroblock or in different macroblocks. This may further include the boundary block pair selector 302 outputting a pixel array containing the two selected blocks.

The image decoder 102 identifies individual pixel edge information and average edge information at step 1408. This may include, for example, the edge analyzer 304 using Equations (2) and (3) to identify vertical edge information and Equations (8) and (9) to identify horizontal edge information for each of the selected image blocks.

The image decoder 102 identifies frequency and difference information at step 1410. This may include, for example, the frequency/difference estimator 306 using Equations (10)-(13) to set the freq_flag. This may also include the frequency/difference estimator 306 using Equation (14) to set the diff_flag.

The image decoder 102 identifies a filter length for each row/column along the vertical or horizontal boundary between the block pair at step 1412. This may include, for example, the filter length estimator 308 using Equations (18)-(20) to identify the filter length for each row/column along the block boundary. This may also include the filter length estimator 308 outputting a filter length value for each row/column in the block pair.

The image decoder 102 filters the block pair using the identified filter length(s) at step 1414. This may include, for example, the filter bank 310 applying a three-, five-, seven-, or nine-tap low pass filter to each row centered at a vertical boundary or to each column centered at a horizontal boundary. This may also include the filter bank 310 outputting filtered pixels representing the block pair with reduced or removed blocking artifacts.

The image decoder 102 determines if there are remaining blocks to be processed at step 1416. If there are additional blocks to be processed, the image decoder 102 returns to step 1406 to select another pair of image blocks.

Otherwise, the method 1400 ends. This indicates that all blocks in the current macroblock have been processed. At this point, the image decoder 102 could take any other suitable actions. For example, if more macroblocks are available for processing, the image decoder 102 could repeat the method 1400 for the next macroblock.

Although FIG. 14 illustrates one example of a method 1400 for de-block filtering, various changes may be made to FIG. 14. For example, although FIG. 14 is illustrated as a series of sequential steps, various steps in the method 1400 may be performed in parallel.

It may be advantageous to set forth definitions of certain words and phrases used in this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, or software, or a combination of at least two of the same. It should be notes that the functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
    identifying a pair of image data blocks separated by a boundary, the image data blocks comprising image information defining multiple pixels in at least one image;
    setting a first flag within a decoding system based on a difference between pixels along the boundary;
    setting a second flag within a decoding system based on a plurality of high frequency anti-symmetric components associated with a plurality of multiple-pixel arrays along the boundary;
    identifying at least one filter length based on edge contents of at least some of the pixels in the at least one image and at least one of the first and second flags; and
    using a filter, filtering at least some of the pixels in the pair of image data blocks along the boundary using the at least one identified filter length by
        filtering only one pixel on each side of the boundary in a region of the at least one image that contains a texture;
        filtering more than one pixel on each side of the boundary in a region of the at least one image that is monotone; and
        filtering a different number of pixels in different rows or columns in a region of the at least one image that contains an edge.

2. The method of claim 1, wherein identifying the at least one filter length comprises identifying the at least one filter length based on a distance between an edge in the at least one image and the boundary.

3. The method of claim 1, wherein identifying the at least one filter length comprises:
    identifying a likelihood for each of at least some of the pixels that the pixel lies on an edge in the at least one image; and
    identifying an average likelihood for each of the image data blocks.

4. The method of claim 3, wherein identifying the likelihood for each of at least some of the pixels comprises identifying multiple likelihoods for a pixel using formulas of:

$$VX_{i,j} = (X_{i-1,j} + 2*X_{i,j} + X_{i+1,j}) - (X_{i-1,j-1} + 2*X_{i,j-1} + X_{i+1,j-1}), \text{ and}$$

$$HX_{i,j} = (X_{i,j-1} + 2*X_{i,j} + X_{i,j+1}) - (X_{i-1,j-1} + 2*X_{i-1,j} + X_{i-1,j+1})$$

where $VX_{i,j}$ represents a vertical likelihood for the pixel at position (i,j), $HX_{i,j}$ represents a horizontal likelihood for the pixel at position (i,j), and $X_{i,j}$ represents a value of the pixel at position (i,j).

5. The method of claim 1, wherein identifying the at least one filter length comprises:
    identifying a first filter length on one side of the boundary;
    identifying a second filter length on another side of the boundary; and
    identifying the filter length for a row or a column of pixels by identifying a lesser of the first and second filter lengths.

6. The method of claim 1, wherein filtering at least some of the pixels in the pair of image data blocks along the boundary comprises filtering at least some of the pixels without smoothing texture regions near the boundary.

7. The method of claim 1, wherein setting the second flag comprises:
    identifying a first high frequency anti-symmetric component associated with a first multiple-pixel array centered at the boundary;
    identifying a second high frequency anti-symmetric component associated with a second multiple-pixel array on one side of the boundary; and
    identifying a third high frequency anti-symmetric component associated with a third multiple-pixel array on another side of the boundary.

8. The method of claim 1, wherein:
    filtering at least some of the pixels comprises applying one of a three-tap filter, a five-tap filter, a seven-tap filter, and a nine-tap filter;
    the three-tap filter applied to one pixel on each side of the boundary;
    the five-tap filter applied to two pixels on each side of the boundary;
    the seven-tap filter applied to three pixels on each side of the boundary; and
    the nine-tap filter applied to four pixels on each side of the boundary.

9. The method of claim 1, wherein identifying the pair of image data blocks comprises:
    identifying a discrete cosine transform ("DCT") type associated with at least one of a current macroblock and a neighboring macroblock;
    identifying a boundary type indicating whether the boundary comprises an intra-macroblock boundary or an inter-macroblock boundary; and
    selecting the pair of image blocks based on the DCT types and the boundary type.

10. An image decoder, comprising:
    a decoder configured to receive encoded image information defining multiple pixels in at least one image and to decode the encoded image information to produce decoded image information; and
    a de-block filter configured to:
        identify a pair of image data blocks represented by the decoded image information and separated by a boundary;
        set a first flag based on a difference between pixels along the boundary;
        set a second flag based on a plurality of high frequency anti-symmetric components associated with a plurality of multiple-pixel arrays along the boundary;
        identify at least one filter length based on edge contents of at least some of the pixels in the at least one image and at least one of the first and second flags; and
        filter at least some of the pixels in the pair of image data blocks along the boundary using the at least one identified filter length by
            filtering only one pixel on each side of the boundary in a region of the at least one image that contains a texture;
            filtering more than one pixel on each side of the boundary in a region of the at least one image that is monotone; and filtering a different number of pixels in different rows or columns in a region of the at least one image that contains an edge.

11. The image decoder of claim 10, wherein the de-block filter comprises a filter length estimator configured to identify the at least one filter length based on a distance between an edge in the at least one image and the boundary.

12. The image decoder of claim 10, wherein the de-block filter comprises an edge analyzer configured to:
identify a likelihood for each of at least some of the pixels that the pixel lies on an edge in the at least one image; and
identify an average likelihood for each of the image data blocks.

13. The image decoder of claim 12, wherein the edge analyzer is configured to identify the likelihood for each of at least some of the pixels by identifying multiple likelihoods for a pixel using formulas of:

$$VX_{i,j}=(X_{i-1,j}+2*X_{i,j}+X_{i+1,j})-(X_{i-1,j-1}+2*X_{i,j-1}+X_{i+1,j-1}), \text{ and}$$

$$HX_{i,j}=(X_{i,j-1}+2*X_{i,j}+X_{i,j+1})-(X_{i-1,j-1}+2*X_{i-1,j}+X_{i-1,j+1})$$

where VXi,j represents a vertical likelihood for the pixel at position (i,j), HXi,j represents a horizontal likelihood for the pixel at position (i,j), and Xi,j represents a value of the pixel at position (i,j).

14. The image decoder of claim 10, wherein the de-block filter comprises a filter length estimator configured to:
identify a first filter length on one side of the boundary;
identify a second filter length on another side of the boundary; and
identify the filter length for a row or a column of pixels by identifying a lesser of the first and second filter lengths.

15. The image decoder of claim 10, wherein the de-block filter comprises a frequency/difference estimator.

16. The image decoder of claim 15, wherein the frequency/difference estimator is configured to set the second flag by:
identifying a first high frequency anti-symmetric component associated with a first multiple-pixel array centered at the boundary;
identifying a second high frequency anti-symmetric component associated with a second multiple-pixel array on one side of the boundary; and
identifying a third high frequency anti-symmetric component associated with a third multiple-pixel array on another side of the boundary.

17. The image decoder of claim 10, wherein the de-block filter comprises a filter bank comprising a three-tap filter, a five-tap filter, a seven-tap filter, and a nine-tap filter, wherein
the three-tap filter is applied to one pixel on each side of the boundary,
the five-tap filter is applied to two pixels on each side of the boundary,
the seven-tap filter is applied to three pixels on each side of the boundary, and
the nine-tap filter is applied to four pixels on each side of the boundary.

18. The image decoder of claim 10, wherein:
the image decoder further comprises an extraction unit configured to identify one or more encoding parameters used to encode the image information; and
the de-block filter is configured to use the encoding parameters to identify the pair of image data blocks.

19. A de-block filter, comprising:
a block pair selector configured to receive one or more macroblocks and to identify a pair of image data blocks separated by a boundary, the image data blocks comprising image information defining multiple pixels in at least one image;
an edge analyzer configured to identify edge contents of at least some of the pixels in the at least one image;
a frequency/difference estimator configured to at least one of:
set a first flag based on a difference between pixels along the boundary; and
set a second flag based on a plurality of high frequency anti-symmetric components associated with a plurality of multiple-pixel arrays along the boundary;
a filter length estimator configured to identify at least one filter length based on the edge contents and at least one of the first and second flags; and
a filter bank configured to filter at least some of the pixels in the pair of image data blocks along the boundary using the at least one identified filter length length by
filtering only one pixel on each side of the boundary in a region of the at least one image that contains a texture;
filtering more than one pixel on each side of the boundary in a region of the at least one image that is monotone; and
filtering a different number of pixels in different rows or columns in a region of the at least one image that contains an edge.

20. The de-block filter of claim 19, wherein the filter length estimator is configured to identify the at least one filter length based on a distance between an edge in the at least one image and the boundary.

21. The de-block filter of claim 19, wherein the edge analyzer is configured to:
identify a likelihood for each of at least some of the pixels that the pixel lies on an edge in the at least one image; and
identify an average likelihood for each of the image data blocks.

22. The de-block filter of claim 21, wherein the edge analyzer is configured to identify the likelihood for each of at least some of the pixels by identifying multiple likelihoods for a pixel using formulas of:

$$VX_{i,j}=(X_{i-1,j}+2*X_{i,j}+X_{i+1,j})-(X_{i-1,j-1}+2*X_{i,j-1}+X_{i+1,j-1}), \text{ and}$$

$$HX_{i,j}=(X_{i,j-1}+2*X_{i,j}+X_{i,j+1})-(X_{i-1,j-1}+2*X_{i-1,j}+X_{i-1,j+1})$$

where VXi,j represents a vertical likelihood for the pixel at position (i,j), HXi,j represents a horizontal likelihood for the pixel at position (i,j), and Xi,j represents a value of the pixel at position (i,j).

23. The de-block filter of claim 19, wherein the filter length estimator is configured to identify the at least one filter length by:
identifying a first filter length on one side of the boundary;
identifying a second filter length on another side of the boundary; and
identifying the filter length for a row or a column of pixels by identifying a lesser of the first and second filter lengths.

24. The de-block filter of claim 19, wherein the first and second flag prevent the de-block filter from smoothing texture regions near the boundary.

25. The de-block filter of claim 19, wherein the frequency/difference estimator is configured to set the second flag by:
identifying a first high frequency anti-symmetric component associated with a first multiple-pixel array centered at the boundary;

identifying a second high frequency anti-symmetric component associated with a second multiple-pixel array on one side of the boundary; and identifying a third high frequency anti-symmetric component associated with a third multiple-pixel array on another side of the boundary.

26. The de-block filter of claim 19, wherein the filter bank comprises a three-tap filter, a five-tap filter, a seven-tap filter, and a nine-tap filter, wherein the three-tap filter is applied to one pixel on each side of the boundary, the five-tap filter is applied to two pixels on each side of the boundary, the seven-tap filter is applied to three pixels on each side of the boundary, and the nine-tap filter applied to four pixels on each side of the boundary.

27. An apparatus, comprising:

an interface configured to receive encoded image information defining multiple pixels in at least one image; and an image decoder configured to:

decode the encoded image information to produce decoded image information;

identify a pair of image data blocks separated by a boundary;

set a first flag based on a difference between pixels along the boundary;

set a second flag based on a plurality of high frequency anti-symmetric components associated with a plurality of multiple-pixel arrays along the boundary;

identify at least one filter length based on edge contents of at least some of the pixels in the at least one image and at least one of the first and second flags; and filter at least some of the pixels in the pair of image data blocks along the boundary using the at least one identified filter length by filtering only one pixel on each side of the boundary in a region of the at least one image that contains a texture;

filtering more than one pixel on each side of the boundary in a region of the at least one image that is monotone; and filtering a different number of pixels in different rows or columns in a region of the at least one image that contains an edge.

28. The apparatus of claim 27, wherein the interface comprises a tuner configured to receive television signals containing the encoded image information.

29. An image decoder, comprising:

a decoder configured to receive encoded image information defining multiple pixels in at least one image and to decode the encoded image information to produce decoded image information representing multiple image data blocks; and a de-block filter configured to at least partially reduce blocking artifacts in the decoded image information based on edge contents of at least some of the pixels in the at least one image, wherein the de-block filter comprises:

a frequency/difference estimator configured to at least one of:

set a first flag based on a difference between pixels along the boundary; and set a second flag based on a plurality of high frequency anti-symmetric components associated with a plurality of multiple-pixel arrays along the boundary;

a filter length estimator configured to identify at least one filter length based on the edge contents and at least one of the first and second flags, wherein the filter is configured to filter only one pixel on each side of the boundary in a region of the at least one image that contains a texture;

filter more than one pixel on each side of the boundary in a region of the at least one image that is monotone; and filter a different number of pixels in different rows or columns in a region of the at least one image that contains an edge.

* * * * *